(12) United States Patent
Kim et al.

(10) Patent No.: US 10,560,858 B2
(45) Date of Patent: Feb. 11, 2020

(54) METHOD AND APPARATUS FOR CONFIGURING MEASUREMENT FOR DISCOVERY REFERENCE SIGNAL IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/126,249

(22) PCT Filed: Mar. 30, 2015

(86) PCT No.: PCT/KR2015/003097
§ 371 (c)(1),
(2) Date: Sep. 14, 2016

(87) PCT Pub. No.: WO2015/147607
PCT Pub. Date: Oct. 1, 2015

(65) Prior Publication Data
US 2017/0086087 A1    Mar. 23, 2017

Related U.S. Application Data

(60) Provisional application No. 61/971,541, filed on Mar. 28, 2014.

(51) Int. Cl.
*H04W 24/10*    (2009.01)
*H04L 5/00*    (2006.01)

(52) U.S. Cl.
CPC .......... *H04W 24/10* (2013.01); *H04L 5/0051* (2013.01)

(58) Field of Classification Search
None
See application file for complete search history.

(56) References Cited

U.S. PATENT DOCUMENTS

| 2011/0170418 A1 | 7/2011 | Sagfors et al. |
| 2012/0155312 A1 | 6/2012 | Kim et al. |
| (Continued) | | |

FOREIGN PATENT DOCUMENTS

| CN | 104170434 | 11/2014 |
| WO | 2010107129 A1 | 9/2010 |
| (Continued) | | |

OTHER PUBLICATIONS

European patent application No. 15768236.0, European search report dated Jul. 26, 2017, 12 pages.

(Continued)

*Primary Examiner* — Hicham B Foud
(74) *Attorney, Agent, or Firm* — Lee Hong Degerman Kang & Waimey

(57) ABSTRACT

A method and apparatus for configuring measurements in a wireless communication system is provided. A user equipment (UE) receives a reference signal (RS) indicator from a network, and evaluates whether a measurement report triggering event is satisfied by only using a measurement result based on a RS indicated by the RS indicator. The RS indicator may indicate which RS is used for reporting the measurement result. The RS indicator may indicate a cell-specific reference signal (CRS) or a discovery reference signal (DRS).

4 Claims, 9 Drawing Sheets

(56) References Cited

U.S. PATENT DOCUMENTS

| | | |
|---|---|---|
| 2012/0213109 A1 | 8/2012 | Xu et al. |
| 2012/0218913 A1* | 8/2012 | Park .................... H04B 7/0632 370/252 |
| 2013/0242787 A1* | 9/2013 | Sun ....................... H04W 24/10 370/252 |

FOREIGN PATENT DOCUMENTS

| | | |
|---|---|---|
| WO | 2012141421 A1 | 10/2012 |
| WO | 2013/051864 | 4/2013 |
| WO | 2014017810 A1 | 1/2014 |

OTHER PUBLICATIONS

European patent application No. 15768236.0, European patent certificate dated Sep. 12, 2018, 25 pages.
Huawei et al., "Enhancements of RRM measurements for small cell on/off," 3GPP TSG RAN WG1 Meeting #76, R1-140038, Prague, Czech Republic, Feb. 10-14, 2014, 4 pages.
Samsung, "DRS Design Requirements," 3GPP TSG RAN WG2 Meeting #85bis, R2-141657, Valencia, Spain, Mar. 31 to Apr. 4, 2014, 5 pages.
LG Electronics Inc., "DRS based RRM measurement," 3GPP TSG-RAN WG2 Meeting #86, R2-142346, Seoul, Korea, May 19-23, 2014, 2 pages.
3GPP TS 36.331 V12.0.0 (Dec. 2013).
The State Intellectual Property Office of the People's Republic of China Application No. 201580015717.6, Office Action dated Dec. 27, 2018, 7 pages.

* cited by examiner

METHOD AND APPARATUS FOR CONFIGURING MEASUREMENT FOR DISCOVERY REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/003097, filed on Mar. 30, 2015, which claims the benefit of U.S. Provisional Application No. 61/971,541, filed on Mar. 28, 2014, the contents of which are all hereby incorporated by reference herein in their entirety.

BACKGROUND OF THE INVENTION

Field of the Invention

The present invention relates to wireless communications, and more particularly, to a method and apparatus for configuring measurement for a discovery reference signal (DRS) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

For small cell enhancements, physical layer aspects have been discussed. Specifically in 3GPP LTE rel-12, when a number of small cells are deployed in a macro cell coverage, the feature of small cell on/off has been discussed, in order to reduce interference, which may occur since all small cells are turned on, and to increase user packet throughput (UPT) of a user equipment (UE). To support fast transition between on/off states of the small cell, various technologies have been studied, one of which is a discovery reference signal (DRS). As the DRS is introduced, a method for configuring measurement for the DRS may be newly required.

SUMMARY OF THE INVENTION

The present invention provides a method and apparatus for configuring measurement for a discovery reference signal (DRS) in a wireless communication system. The present invention provides a method for receiving a reference signal (RS) indicator, and configuring measurement only using a RS indicated by the RS indicator.

In an aspect, a method for configuring, by a user equipment (UE), measurements in a wireless communication system is provided. The method includes receiving, by the UE, a reference signal (RS) indicator from a network, and evaluating, by the UE, whether a measurement report triggering event is satisfied by only using a measurement result based on a RS indicated by the RS indicator.

In another aspect, a user equipment (UE) is provided. The UE includes a memory, a transceiver, and a processor coupled to the memory and the transceiver, and configured to control the transceiver to receive a reference signal (RS) indicator from a network, and evaluate whether a measurement report triggering event is satisfied by only using a measurement result based on a RS indicated by the RS indicator.

Measurement configuration for a cell-specific reference signal (CRS) and DRS can be determined clearly.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
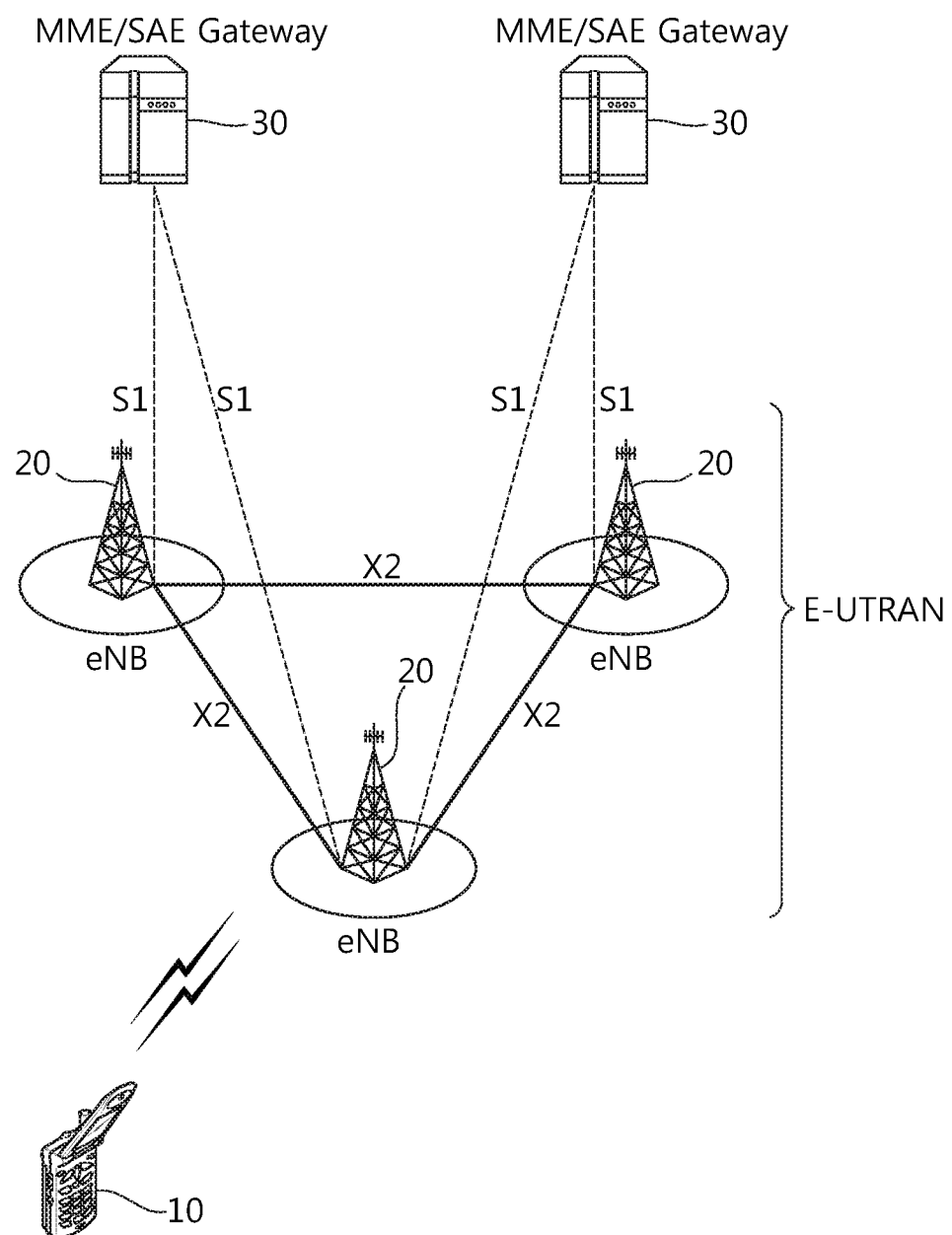
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
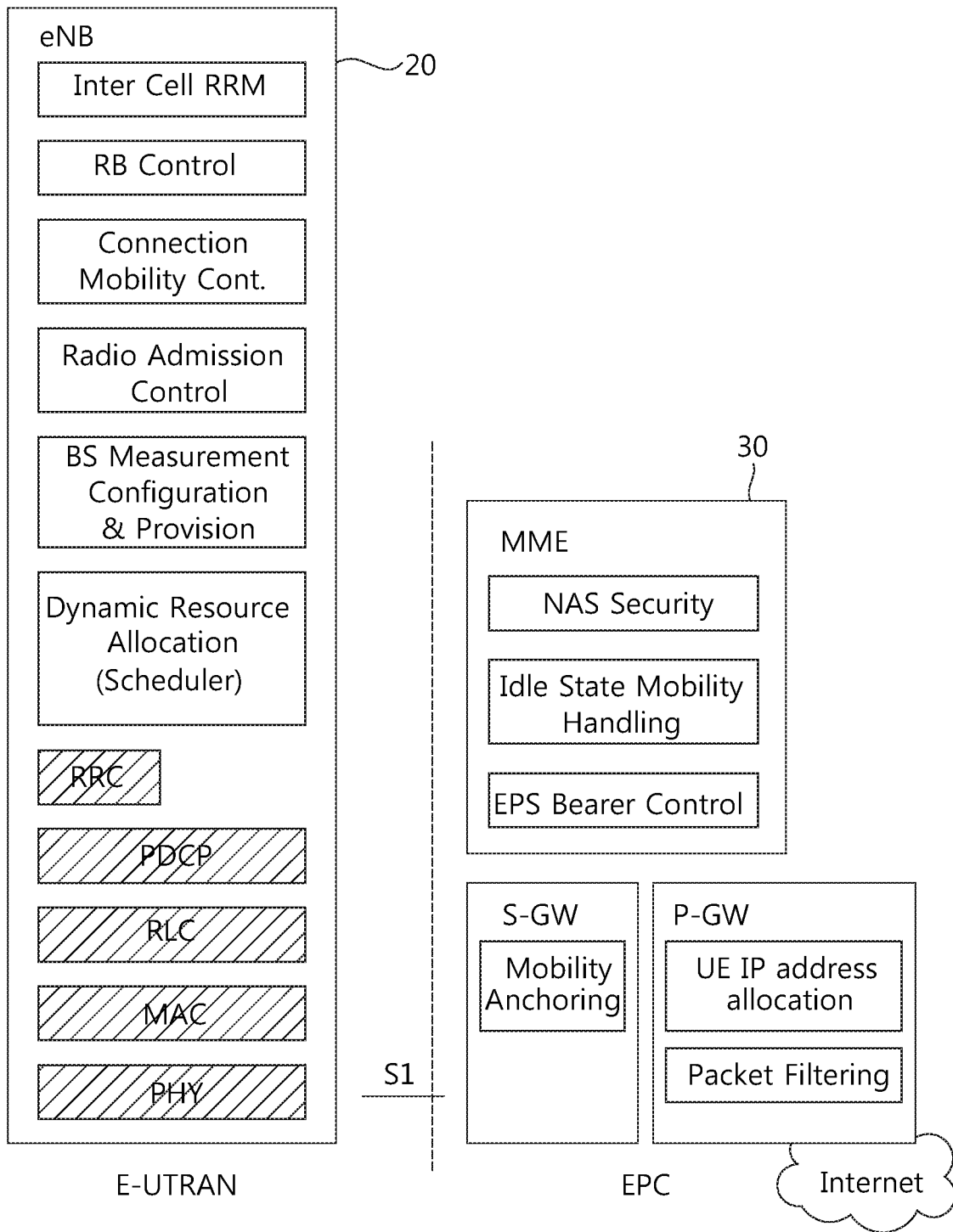
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
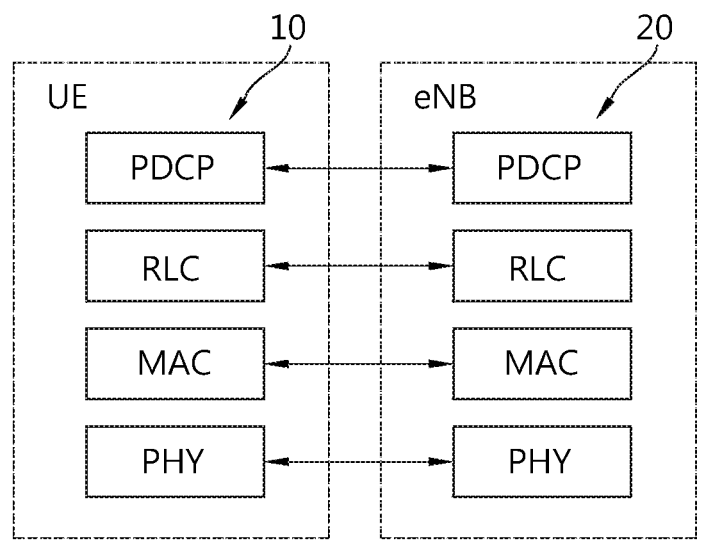
FIG. 3 shows a block diagram of a user plane protocol stack of an LTE system.
Figure 4:
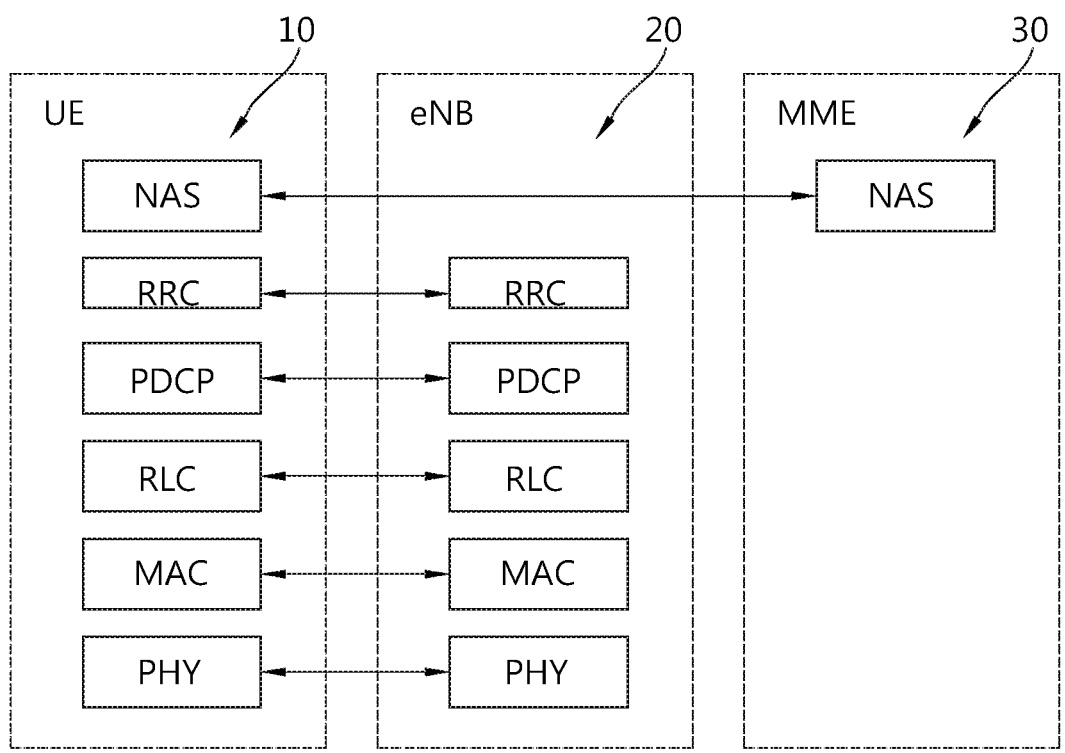
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
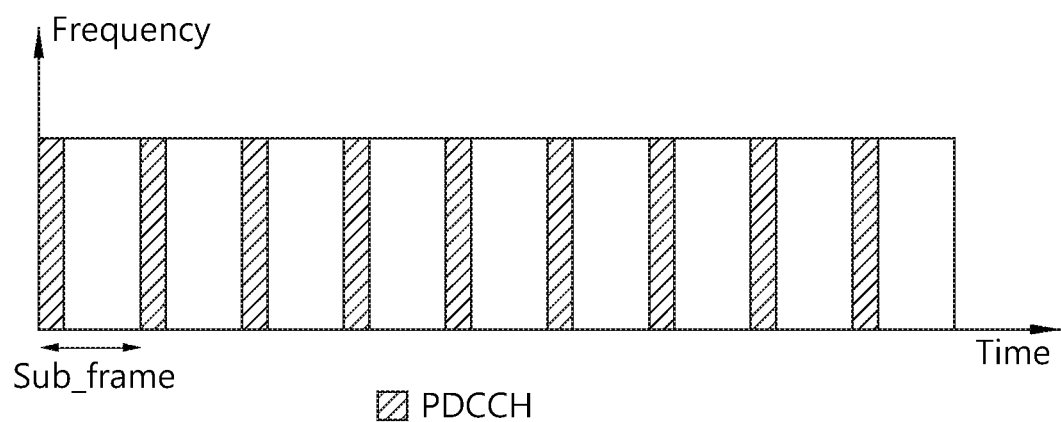
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

In 3GPP LTE, a discovery reference signal (DRS) has been newly introduced for one aspect of small cell enhancements. A small call in off state may transmit the DRS for the UE to discovery the small cell. In order for the UE to receive immediately data packet which is to be transmitted when the small cell transits to on state, the small cell may carry information, which is necessary for procedures which should have been performed before the small transits to on state, in the DRS. How to transmit the DRS, which information is included in the DRS, and/or how the UE measures the DRS have been discussed.

Measurements is described. It may be referred to Section 5.5 of 3GPP TS 36.331 V12.0.0 (2013-12). The UE reports measurement information in accordance with the measurement configuration as provided by the E-UTRAN. The E-UTRAN provides the measurement configuration applicable for a UE in RRC_CONNECTED by means of dedicated signaling, i.e. using the RRCConnectionReconfiguration message.

The UE can be requested to perform the following types of measurements:
- Intra-frequency measurements: measurements at the downlink carrier frequency(ies) of the serving cell(s).
- Inter-frequency measurements: measurements at frequencies that differ from any of the downlink carrier frequency(ies) of the serving cell(s).
- Inter-RAT measurements of UTRA frequencies.
- Inter-RAT measurements of GERAN frequencies.
- Inter-RAT measurements of CDMA2000 high rate packet data (HRPD) or CDMA2000 single carrier radio transmission technology (1×RTT) frequencies.

The measurement configuration includes the following parameters:

1. Measurement objects: The objects on which the UE shall perform the measurements.
   For intra-frequency and inter-frequency measurements a measurement object is a single E-UTRA carrier frequency. Associated with this carrier frequency, The E-UTRAN can configure a list of cell specific offsets and a list of 'blacklisted' cells. Blacklisted cells are not considered in event evaluation or measurement reporting.
   For inter-RAT UTRA measurements a measurement object is a set of cells on a single UTRA carrier frequency.
   For inter-RAT GERAN measurements a measurement object is a set of GERAN carrier frequencies.
   For inter-RAT CDMA2000 measurements a measurement object is a set of cells on a single (HRPD or 1×RTT) carrier frequency.
   Some measurements using the above mentioned measurement objects, only concern a single cell, e.g. measurements used to report neighbouring cell system information, primary cell (PCell) UE Rx-Tx time difference.

2. Reporting configurations: A list of reporting configurations where each reporting configuration consists of the following:
   Reporting criterion: The criterion that triggers the UE to send a measurement report. This can either be periodical or a single event description.
   Reporting format: The quantities that the UE includes in the measurement report and associated information (e.g. number of cells to report).

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report.

4. Quantity configurations: One quantity configuration is configured per RAT type. The quantity configuration defines the measurement quantities and associated filtering used for all event evaluation and related reporting of that measurement type. One filter can be configured per measurement quantity.

5. Measurement gaps: Periods that the UE may use to perform measurements, i.e. no (UL, DL) transmissions are scheduled.

The E-UTRAN only configures a single measurement object for a given frequency, i.e. it is not possible to configure two or more measurement objects for the same frequency with different associated parameters, e.g. different offsets and/or blacklists. The E-UTRAN may configure multiple instances of the same event, e.g. by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the PCell and one or more secondary cells (SCells), if configured for a UE supporting carrier aggregation (CA).

2. Listed cells—these are cells listed within the measurement object(s).

3. Detected cells—these are cells that are not listed within the measurement object(s) but are detected by the UE on the carrier frequency(ies) indicated by the measurement object(s).

For E-UTRA, the UE measures and reports on the serving cell(s), listed cells and detected cells. For inter-RAT UTRA, the UE measures and reports on listed cells and optionally on cells that are within a range for which reporting is allowed by the E-UTRAN. For inter-RAT GERAN, the UE measures and reports on detected cells. For inter-RAT CDMA2000, the UE measures and reports on listed cells. For inter-RAT UTRA and CDMA2000, the UE measures and reports also on detected cells for the purpose of self-organizing network (SON).

The E-UTRAN applies the procedure as follows:
- to ensure that, whenever the UE has a measConfig, it includes a measObject for each serving frequency;
- to configure at most one measurement identity using a reporting configuration with the purpose set to reportCGI;
- for serving frequencies, set the E-UTRA absolute radio frequency channel number (EARFCN) within the corresponding measObject according to the band as used for reception/transmission;

The UE shall:
1> if the received measConfig includes the measObjectToRemoveList:
  2> perform the measurement object removal procedure;
1> if the received measConfig includes the measObjectToAddModList:
  2> perform the measurement object addition/modification procedure;
1> if the received measConfig includes the reportConfigToRemoveList:
  2> perform the reporting configuration removal procedure;
1> if the received measConfig includes the reportConfigToAddModList:
  2> perform the reporting configuration addition/modification procedure;
1> if the received measConfig includes the quantityConfig:
  2> perform the quantity configuration procedure;

1> if the received measConfig includes the measIdToRemoveList:
2> perform the measurement identity removal procedure;
1> if the received measConfig includes the measIdToAddModList:
2> perform the measurement identity addition/modification procedure;
1> if the received measConfig includes the measGapConfig:
2> perform the measurement gap configuration procedure;
1> if the received measConfig includes the s-Measure:
2> set the parameter s-Measure within VarMeasConfig to the lowest value of the reference signal received power (RSRP) ranges indicated by the received value of s-Measure;
1> if the received measConfig includes the preRegistrationInfoHRPD:
2> forward the preRegistrationInfoHRPD to CDMA2000 upper layers;
1> if the received measConfig includes the speed-StatePars:
2> set the parameter speedStatePars within VarMeasConfig to the received value of speedStatePars;
For measurement identity removal, the UE shall:
1> for each measId included in the received measIdToRemoveList that is part of the current UE configuration in VarMeasConfig:
2> remove the entry with the matching measId from the measIdList within the VarMeasConfig;
2> remove the measurement reporting entry for this measId from the VarMeasReportList, if included;
2> stop the periodical reporting timer or timer T321, whichever one is running, and reset the associated information (e.g. timeToTrigger) for this measId;
The UE does not consider the message as erroneous if the measIdToRemoveList includes any measId value that is not part of the current UE configuration.
For measurement identity addition/modification, the E-UTRAN configures a measId only if the corresponding measurement object, the corresponding reporting configuration and the corresponding quantity configuration, are configured. The UE shall:
1> for each measId included in the received measIdToAddModList:
2> if an entry with the matching measId exists in the measIdList within the VarMeasConfig:
3> replace the entry with the value received for this measId;
2> else:
3> add a new entry for this measId within the VarMeasConfig;
2> remove the measurement reporting entry for this measId from the VarMeasReportList, if included;
2> stop the periodical reporting timer or timer T321, whichever one is running, and reset the associated information (e.g. timeToTrigger) for this measId;
2> if the triggerType is set to periodical and the purpose is set to reportCGI in the reportConfig associated with this measId:
3> if the measObject associated with this measId concerns E-UTRA:
4> if the si-RequestForHO is included in the reportConfig associated with this measId:
5> start timer T321 with the timer value set to 150 ms for this measId;
4> else:
5> start timer T321 with the timer value set to 1 second for this measId;
3> else if the measObject associated with this measId concerns UTRA:
4> if the si-RequestForHO is included in the reportConfig associated with this measId:
5> for UTRA FDD, start timer T321 with the timer value set to 2 seconds for this measId;
5> for UTRA TDD, start timer T321 with the timer value set to [1 second] for this measId;
4> else:
5> start timer T321 with the timer value set to 8 seconds for this measId;
3> else:
4> start timer T321 with the timer value set to 8 seconds for this measId;
For measurement object removal, the UE shall:
1> for each measObjectId included in the received measObjectToRemoveList that is part of the current UE configuration in VarMeasConfig:
2> remove the entry with the matching measObjectId from the measObjectList within the VarMeasConfig;
2> remove all measId associated with this measObjectId from the measIdList within the VarMeasConfig, if any;
2> if a measId is removed from the measIdList:
3> remove the measurement reporting entry for this measId from the VarMeasReportList, if included;
3> stop the periodical reporting timer or timer T321, whichever one is running, and reset the associated information (e.g. timeToTrigger) for this measId;
The UE does not consider the message as erroneous if the measObjectToRemoveList includes any measObjectId value that is not part of the current UE configuration.
For measurement object addition/modification, the UE shall:
1> for each measObjectId included in the received measObjectToAddModList:
2> if an entry with the matching measObjectId exists in the measObjectList within the VarMeasConfig, for this entry:
3> replace the entry with the value received for this measObject, except for the fields cellsToAddModList, blackCellsToAddModList, cellsToRemoveList, blackCellsToRemoveList and measSubframePatternConfigNeigh;
3> if the received measObject includes the cellsToRemoveList:
4> for each cellIndex included in the cellsToRemoveList:
5> remove the entry with the matching cellIndex from the cellsToAddModList;
3> if the received measObject includes the cellsToAddModList:
4> for each cellIndex value included in the cellsToAddModList:
5> if an entry with the matching cellIndex exists in the cellsToAddModList:
6> replace the entry with the value received for this cellIndex;
5> else:
6> add a new entry for the received cellIndex to the cellsToAddModList;
3> if the received measObject includes the blackCellsToRemoveList:
4> for each cellIndex included in the blackCellsToRemoveList:
5> remove the entry with the matching cellIndex from the blackCellsToAddModList;

For each cellIndex included in the blackCellsToRemoveList that concerns overlapping ranges of cells, a cell is removed from the black list of cells only if all cell indexes containing it are removed.

3> if the received measObject includes the blackCellsToAddModList:
4> for each cellIndex included in the blackCellsToAddModList:
5> if an entry with the matching cellIndex is included in the blackCellsToAddModList:
6> replace the entry with the value received for this cellIndex;
5> else:
6> add a new entry for the received cellIndex to the blackCellsToAddModList;
3> if the received measObject includes measSubframePatternConfigNeigh:
4> set measSubframePatternConfigNeigh within the VarMeasConfig to the value of the received field
3> for each measId associated with this measObjectId in the measIdList within the VarMeasConfig, if any:
4> remove the measurement reporting entry for this measId from the VarMeasReportList, if included;
4> stop the periodical reporting timer or timer T321, whichever one is running, and reset the associated information (e.g. timeToTrigger) for this measId;
2> else:
3> add a new entry for the received measObject to the measObjectList within VarMeasConfig;

For reporting configuration removal, the UE shall:
1> for each reportConfigId included in the received reportConfigToRemoveList that is part of the current UE configuration in VarMeasConfig:
2> remove the entry with the matching reportConfigId from the reportConfigList within the VarMeasConfig;
2> remove all measId associated with the reportConfigId from the measIdList within the VarMeasConfig, if any;
2> if a measId is removed from the measIdList:
3> remove the measurement reporting entry for this measId from the VarMeasReportList, if included;
3> stop the periodical reporting timer or timer T321, whichever one is running, and reset the associated information (e.g. timeToTrigger) for this measId;

The UE does not consider the message as erroneous if the reportConfigToRemoveList includes any reportConfigId value that is not part of the current UE configuration.

For reporting configuration addition/modification, the UE shall:
1> for each reportConfigId included in the received reportConfigToAddModList:
2> if an entry with the matching reportConfigId exists in the reportConfigList within the VarMeasConfig, for this entry:
3> replace the entry with the value received for this reportConfig;
3> for each measId associated with this reportConfigId included in the measIdList within the VarMeasConfig, if any:
4> remove the measurement reporting entry for this measId from in VarMeasReportList, if included;
4> stop the periodical reporting timer or timer T321, whichever one is running, and reset the associated information (e.g. timeToTrigger) for this measId;
2> else:
3> add a new entry for the received reportConfig to the reportConfigList within the VarMeasConfig;

Table 1 shows an example of the MeasConfig information element (IE), which specifies measurements to be performed by the UE, and covers intra-frequency, inter-frequency and inter-RAT mobility as well as configuration of measurement gaps.

TABLE 1

```
-- ASN1START
MeasConfig ::=    SEQUENCE {
-- Measurement objects
measObjectToRemoveList        MeasObjectToRemoveList
    OPTIONAL, -- Need ON
measObjectToAddModList        MeasObjectToAddModList
    OPTIONAL, -- Need ON
-- Reporting configurations
reportConfigToRemoveList      ReportConfigToRemoveList        OPTIONAL, -
    - Need ON
reportConfigToAddModList      ReportConfigToAddModList        OPTIONAL,
    -- Need ON
-- Measurement identities
measIdToRemoveList            MeasIdToRemoveList
    OPTIONAL, -- Need ON
measIdToAddModList            MeasIdToAddModList
    OPTIONAL,  -- Need ON
-- Other parameters
quantityConfig                QuantityConfig                  OPTIONAL, --
    Need ON
measGapConfig                 MeasGapConfig
    OPTIONAL,  -- Need ON
s-Measure                     RSRP-Range
    OPTIONAL,  -- Need ON
preRegistrationInfoHRPD       PreRegistrationInfoHRPD         OPTIONAL, --
    Need OP
speedStatePars                CHOICE {
    release                       NULL,
    setup                         SEQUENCE {
    mobilityStateParameters   MobilityStateParameters,
    timeToTrigger-SF              SpeedStateScaleFactors
    }
}
OPTIONAL,   -- Need ON
...,
```

TABLE 1-continued

```
[[ measObjectToAddModList-v9e0          MeasObjectToAddModList-v9e0        OPTIONAL
        -- Need ON
]]
}
MeasIdToRemoveList ::=                  SEQUENCE (SIZE (1..maxMeasId)) OF MeasId
MeasObjectToRemoveList ::=              SEQUENCE (SIZE (1..maxObjectId)) OF
MeasObjectId
ReportConfigToRemoveList ::=            SEQUENCE (SIZE (1..maxReportConfigId)) OF
ReportConfigId
-- ASN1STOP
```

Table 2 shows an example of the ReportConfigEUTRA IE, which specifies criteria for triggering of an E-UTRA measurement reporting event. The E-UTRA measurement reporting events are labelled AN with N equal to 1, 2 and so on. E-UTRAN measurement reporting events are as follows.

Event A1: Serving becomes better than absolute threshold;

Event A2: Serving becomes worse than absolute threshold;

Event A3: Neighbor becomes amount of offset better than PCell;

Event A4: Neighbor becomes better than absolute threshold;

Event A5: PCell becomes worse than absolute threshold1 and Neighbor becomes better than another absolute threshold2.

Event A6: Neighbor becomes amount of offset better than SCell.

TABLE 2

```
-- ASN1START
ReportConfigEUTRA ::=                   SEQUENCE {
triggerType                             CHOICE {
event                                       SEQUENCE {
eventId                                         CHOICE {
eventA1                                             SEQUENCE {
a1-Threshold                                            ThresholdEUTRA
},
eventA2                                             SEQUENCE {
a2-Threshold                                            ThresholdEUTRA
},
eventA3                                             SEQUENCE {
a3-Offset                                               INTEGER (-30..30),
reportOnLeave                                           BOOLEAN
},
eventA4                                             SEQUENCE {
a4-Threshold                                            ThresholdEUTRA
},
eventA5                                             SEQUENCE {
a5-Threshold1                                           ThresholdEUTRA,
a5-Threshold2                                           ThresholdEUTRA
},
...,
eventA6-r10                                         SEQUENCE {
a6-Offset-r10                                           INTEGER (-30..30),
a6-ReportOnLeave-r10                                    BOOLEAN
}
},
Hysteresis                                      Hysteresis,
timeToTrigger                                   TimeToTrigger
},
Periodical                                  SEQUENCE {
Purpose                                         ENUMERATED {
reportStrongestCells, reportCGI}
}
},
triggerQuantity                             ENUMERATED {rsrp, rsrq},
reportQuantity                              ENUMERATED {sameAsTriggerQuantity, both},
maxReportCells                              INTEGER (1..maxCellReport),
reportInterval                          ReportInterval,
reportAmount                                ENUMERATED {r1, r2, r4, r8, r16, r32, r64, infinity},
...,
[[ si-RequestForHO-r9                           ENUMERATED {setup}         OPTIONAL,    --
Cond reportCGI
ue-RxTxTimeDiffPeriodical-r9                    ENUMERATED {setup}         OPTIONAL    -- Need
OR
]],
[[ includeLocationInfo-r10                      ENUMERATED {true}          OPTIONAL,   -- Need
OR
reportAddNeighMeas-r10                          ENUMERATED {setup}         OPTIONAL    --
Need OR
]]
}
```

TABLE 2-continued

```
ThresholdEUTRA ::=     CHOICE{
threshold-RSRP         RSRP-Range,
threshold-RSRQ         RSRQ-Range
}
-- ASN1STOP
```

As the DRS is introduced, the UE may be configured to perform both CRS based measurement and DRS based measurement for one frequency layer. In this case, the measurement results acquired from the CRS based measurement and the measurement results acquired from the DRS based measurement may be different. Therefore, the network should be able to know whether the reported measurement results are based on CRS or DRS. However, according to the prior art, it is impossible because there is only one measurement object for one frequency.

In order to solve the problem described above, a method for configuring measurement for the DRS according to an embodiment of the present invention is described.

Figure 6:
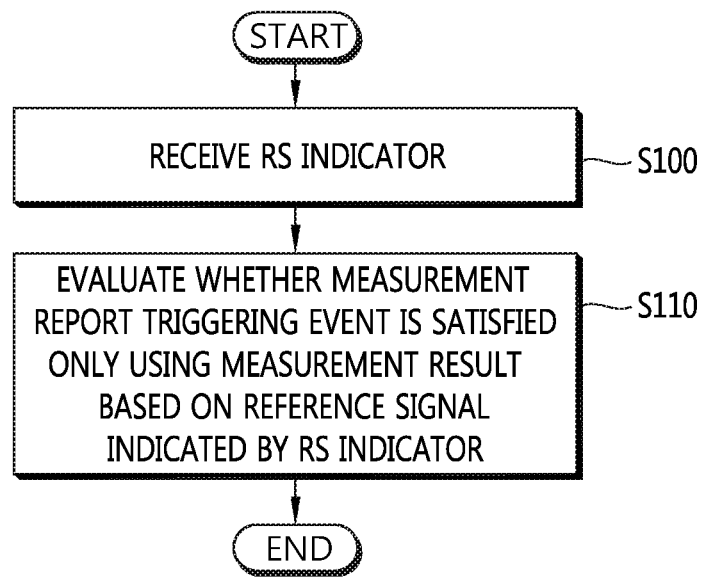
FIG. 6 shows an example of a method for configuring measurements according to an embodiment of the present invention.

FIG. 6 shows an example of a method for configuring measurements according to an embodiment of the present invention. According to an embodiment of the present invention, separate measurement reports for the CRS and DRS may be configured.

In step S100, the UE receives a RS indicator. The RS indicator may be configured per measurement report triggering event by the network. The RS indicator may be included in the reporting configuration and may indicate one of the CRS or DRS.

In step S110, the UE evaluates whether a measurement report triggering event is satisfied by only using a measurement result based on a RS indicated by the RS indicator. That is, even though the UE has measurement results acquired by measuring both the CRS and DRS for the same cell, when evaluating whether a measurement report triggering event is satisfied or not, the UE uses only measurement results acquired by measuring the RS indicated by the RS indicator. Specifically, if the RS indicator, which is received from the network along with the corresponding measurement report triggering event, indicates the CRS, the UE uses only measurement results acquired by performing CRS based measurement when evaluating whether the corresponding measurement report triggering event is satisfied or not, even though the UE has measurement results acquired by performing DRS based measurement for the same cell. Or, if the RS indicator, which is received from the network along with the corresponding measurement report triggering event indicates the DRS, the UE uses only measurement results acquired by performing DRS based measurement when evaluating whether the corresponding measurement report triggering event is satisfied or not, even though the UE has measurement results acquired by performing CRS based measurement for the same cell.

For a measurement report triggering event which includes two measurement results of two cells, respectively, e.g. event A3, A5, A6 and B2, two RS indicators may be configured. In this case, when evaluating whether the measurement report triggering event is satisfied or not, the UE may use only measurement results which are acquired by measuring RSs indicated by the first RS indicator and the second RS indicator for the first cell and the second cell, respectively, even though the UE has measurement results acquired by measuring another RS for the same cell. If the first RS indicator indicates the CRS, the UE may use only measurement results acquired by performing CRS based measurement for the first cell. If the first RS indicator indicates the DRS, the UE may use only measurement results acquired by performing DRS based measurement for the first cell. If the second RS indicator indicates the CRS, the UE may use only measurement results acquired by performing CRS based measurement for the second cell. If the second RS indicator indicates the DRS, the UE uses only measurement results acquired by performing DRS based measurement for the second cell.

Or, the first RS indicator which is applicable to the first cell may be omitted and implicitly indicate that the measurement results acquired by performing CRS based measurement is used for the first cell. Accordingly, only one RS indicator may be configured to the UE for the second cell. If the RS indicator indicates the CRS, the UE may use only measurement results acquired by performing CRS based measurement for the second cell. If the RS indicator indicates the DRS, the UE uses only measurement results acquired by performing DRS based measurement for the second cell. In the description above, the first cell may be a serving cell configured to the UE, i.e. PCell or SCell, and the second cell may be a neighbor cell.

Figure 7:
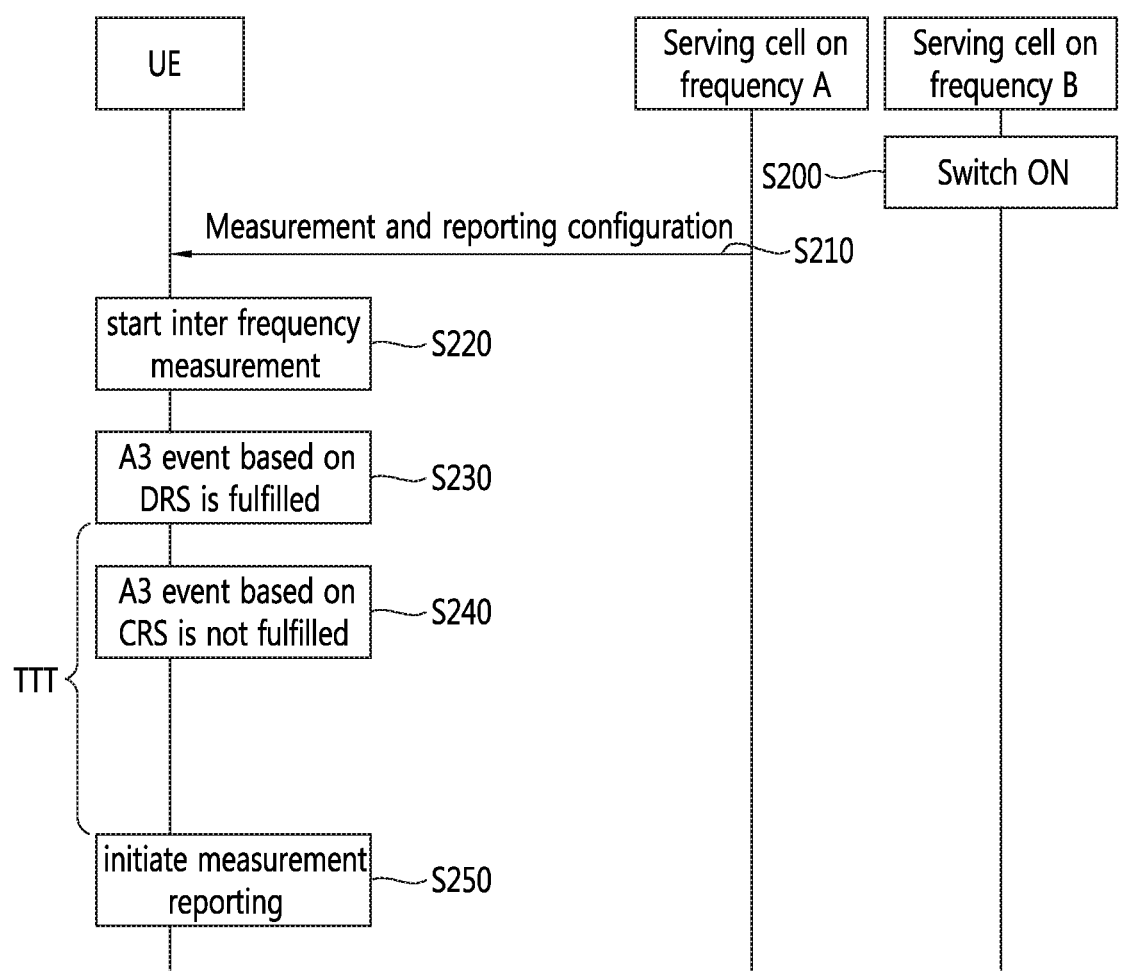
FIG. 7 shows another example of a method for configuring measurements according to an embodiment of the present invention.

FIG. 7 shows another example of a method for configuring measurements according to an embodiment of the present invention.

In step S200, it is assumed that there are three neighbor cells near the UE. It is assumed that the first and second neighbor cell is ON/OFF capable cell (small cells). It is assumed that the first cell is ON state and transmits both CRS and DRS. It is assumed that the second cell is OFF state and transmits only DRS. It is assumed that the third neighbor cell is non-ON/OFF capable cell, so the third neighbor cell is always ON state and transmits only CRS.

In step S210, the UE receives the measurement and reporting configuration from the serving cell. Accordingly, the UE is configured to perform the inter-frequency measurement. It is assumed that the configured measurement object is frequency B and two reporting configuration is linked with the measurement object. It is further assumed that in the first reporting configuration, measurement report triggering event is set to A3 and the RS indicator indicates the DRS. It is further assumed that in the second reporting configuration, the measurement report triggering event is also set to A3 and the RS indicator indicates the CRS.

In step S220, the UE starts performing measurement for frequency B. For the first neighbor cell, the UE performs DRS based measurement as well as CRS based measurement. So the UE may acquire two types of measurement results from the first neighbor cell, which are measurement results based on CRS and measurement results based on DRS. For the second neighbor cell and third neighbor cell, the UE performs only DRS based measurement and CRS based measurement, respectively.

In step S230, for DRS based measurements on the first neighbor cell, A3 event configured in the first reporting configuration is fulfilled. In step S240, for CRS based measurements on the first neighbor cell, A3 event configured in the second reporting configuration is not fulfilled. However, the fulfillment of the A3 event configured by in the first configuration is maintained, because measurement results only based on DRS are involved in the first reporting configuration.

In step S250, during timeToTrigger, A3 event configured in the first reporting configuration is fulfilled for DRS based measurements on the first neighbor cell. Accordingly, the UE initiates the measurement reporting procedure. The measurement results to be reported to the serving cell includes measurement results only based on DRS.

Alternatively, according to another embodiment of the present invention, separate measurement objects for the CRS and DRS may be configured. For the same frequency, two measurement may be configured, one of which is type 1 measurement object for CRS based measurement, and other is type 2 measurement object for DRS based measurement. The type 1 measurement object may be the existing measurement object and the type 2 measurement object may be new type measurement object. The type indicator may indicate whether the measurement object is the existing measurement object for CRS based measurement or new type measurement object for DRS based measurement. The type indicator may be signaled along with the measurement object when the UE is configured to perform measurement. The UE may perform CRS based measurement for a frequency configured by the type 1 measurement object, and perform DRS based measurement for a frequency configured by the type 2 measurement object. For example, if a frequency is configured by the type 1 measurement object and is not configured by the type 2 measurement object to the UE, the UE may perform CRS based measurement and may not perform DRS based measurement for the frequency. If a frequency is configured by both the type 1 measurement object and type 2 measurement object to the UE, the UE may perform CRS based measurement and DRS based measurement for the frequency.

Figure 8:
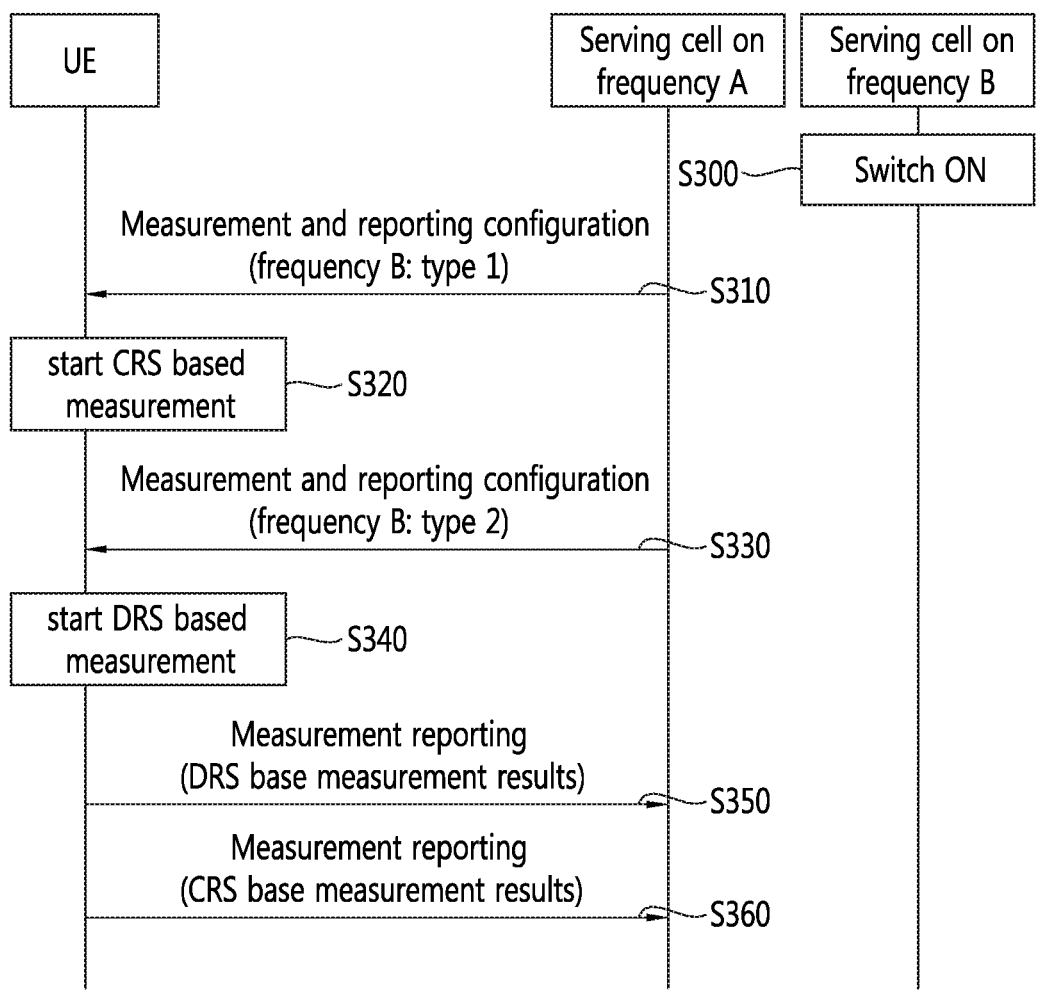
FIG. 8 shows another example of a method for configuring measurements according to an embodiment of the present invention.

FIG. 8 shows another example of a method for configuring measurements according to an embodiment of the present invention.

In step S300, it is assumed that there is a neighbor cell on frequency B near the UE. It is assumed that the neighbor cell is ON/OFF capable cell and the cell is ON state. So the cell transmits DRS as well as CRS.

In step S310, the UE receives the measurement and reporting configuration from the serving cell. Accordingly, the UE is configured to perform the inter-frequency measurement. It is assumed that the configured type 1 measurement object is frequency B.

In step S320, the UE starts performing CRS based measurement for frequency B. The UE acquires measurement results from the neighbor cell, but the results do not fulfill the corresponding measurement report triggering event. The UE cannot detect DRS of the neighbor cell.

In step S330, the UE receives the measurement and reporting re-configuration, which indicates that the frequency B is added as the type 2 measurement object.

In step S340, the UE performs both CRS based measurement and DRS based measurement for frequency B.

In step S350, the measurement results acquired performing DRS based measurement on the neighbor cell fulfills the corresponding measurement report triggering event. Then, the UE reports the results which include measurement results only based on DRS. In step S360, the measurement results acquired performing CRS based measurement on the neighbor cell fulfills the corresponding measurement report triggering event. Then, the UE reports the results which include measurement results only based on CRS.

Figure 9:
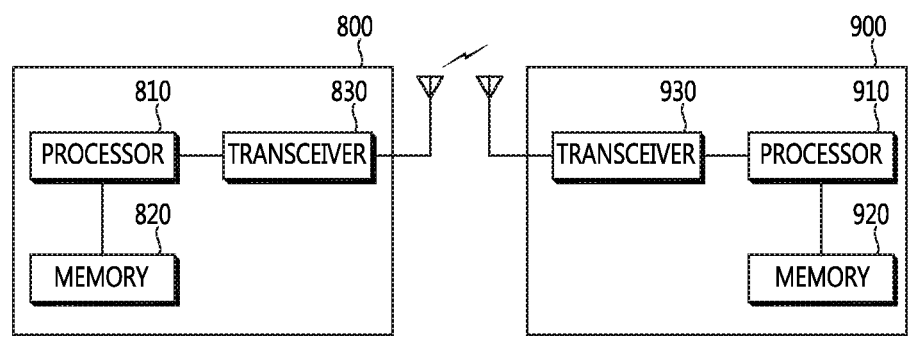
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
    performing measurement on a serving cell based on both a cell-specific reference signal (CRS) and a discovery reference signal (DRS);
    performing measurement on a neighbor cell based on both the CRS and the DRS;
    receiving a first reference signal (RS) indicator from a network, wherein the first RS indicator indicates one of a measurement result based on CRS of the serving cell and a measurement result based on DRS of the serving cell;

receiving a second RS indicator from the network, wherein the second RS indicator indicates one of a measurement result based on CRS of the neighbor cell and a measurement result based on DRS of the neighbor cell;

determining whether a measurement report triggering event is satisfied or not, by comparing the measurement result of the serving cell indicated by the first RS indicator and the measurement result of the neighbor cell indicated by the second RS indicator; and triggering a measurement report when the measurement report triggering event is satisfied.

2. The method of claim 1, wherein the first RS indicator and the second RS indicator are received via a reporting configuration.

3. A user equipment (UE) for configuring measurements in a wireless communication system, the UE comprising:

a memory configured to store information;

a transceiver configured to transmit and receive signals; and a processor coupled to the memory and the transceiver and configured to:

perform measurement on a serving cell based on both a cell-specific reference signal (CRS) and a discovery reference signal (DRS);

perform measurement on a neighbor cell based on both the CRS and the DRS;

control the transceiver to receive a first reference signal (RS) indicator from a network, wherein the first RS indicator indicates one of a measurement result based on CRS of the serving cell and a measurement result based on DRS of the serving cell;

control the transceiver to receive a second RS indicator from the network, wherein the second RS indicator indicates one of a measurement result based on CRS of the neighbor cell and a measurement result based on DRS of the neighbor cell;

determining whether a measurement report triggering event is satisfied, by comparing the measurement result of the serving cell indicated by the first RS indicator and the measurement result of the neighbor cell indicated by the second RS indicator; and triggering a measurement report when the measurement report triggering event is satisfied.

4. The UE of claim 3, wherein the first RS indicator and the second RS indicator are received via a reporting configuration.

* * * * *